May 9, 1961     J. G. ROGERS     2,983,786
OPTICAL SCANNING DEVICE
Filed Aug. 29, 1958     3 Sheets-Sheet 1
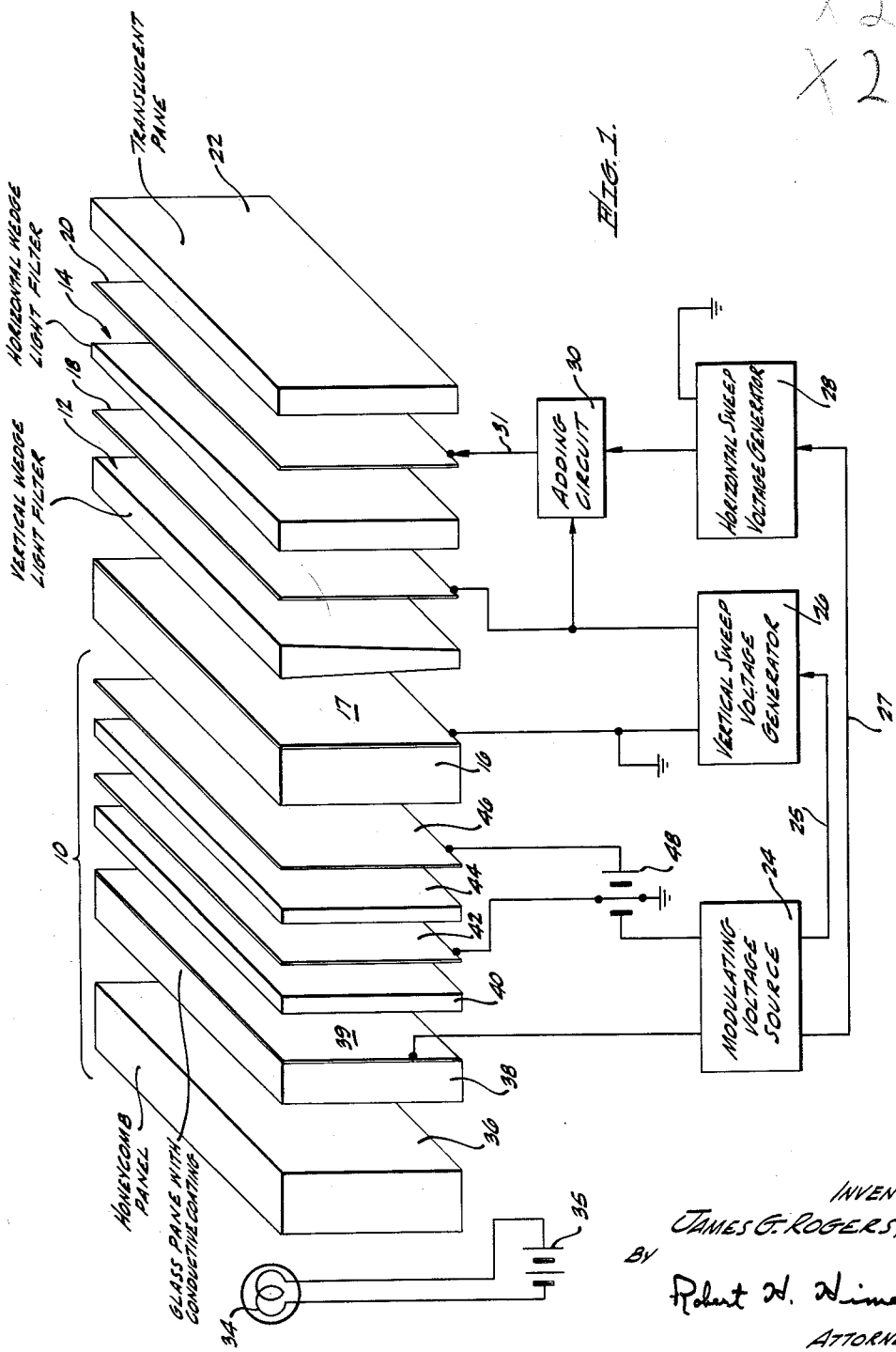
INVENTOR.
JAMES G. ROGERS,
BY Robert H. Himes
ATTORNEY

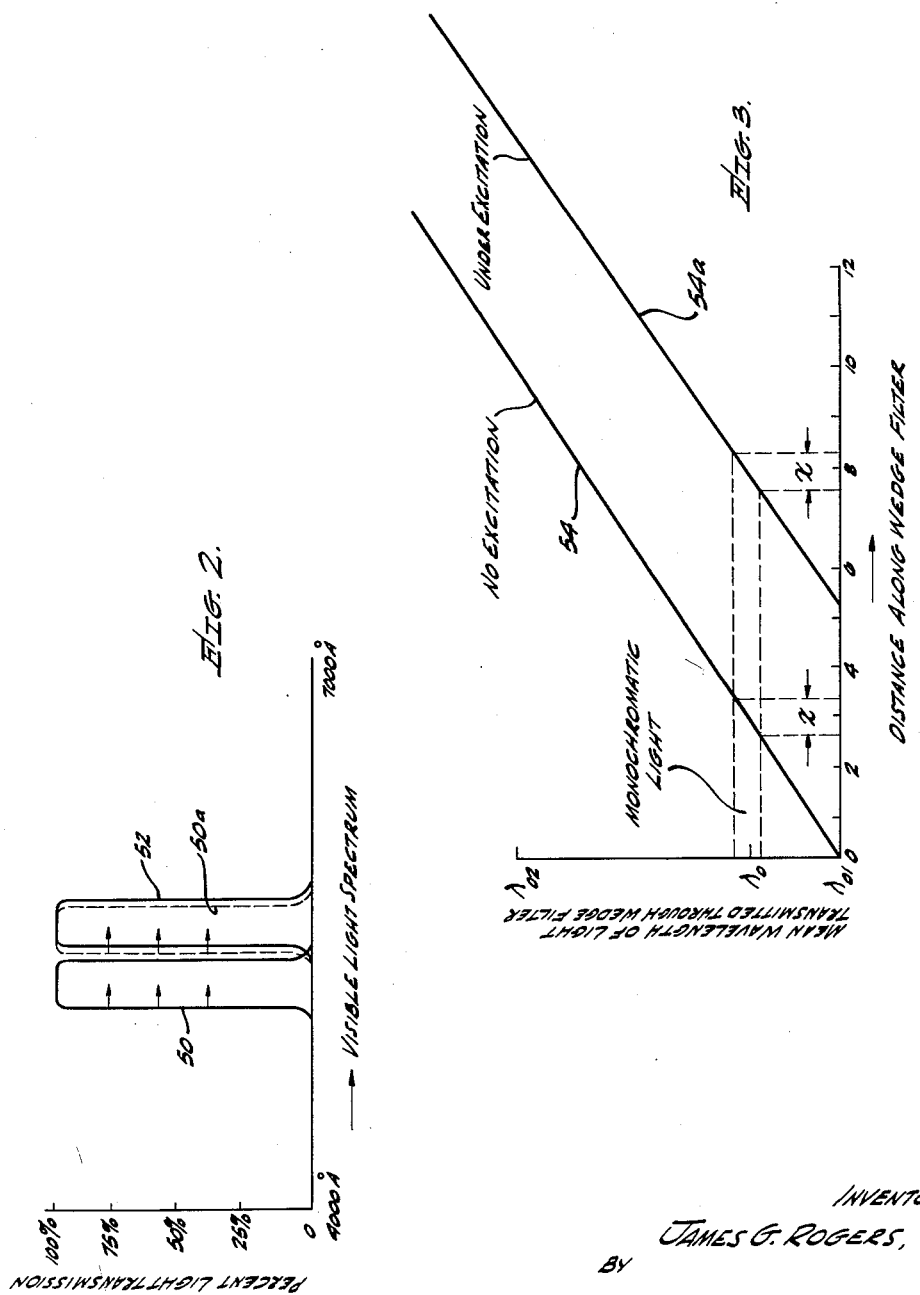

May 9, 1961  J. G. ROGERS  2,983,786
OPTICAL SCANNING DEVICE
Filed Aug. 29, 1958  3 Sheets-Sheet 3
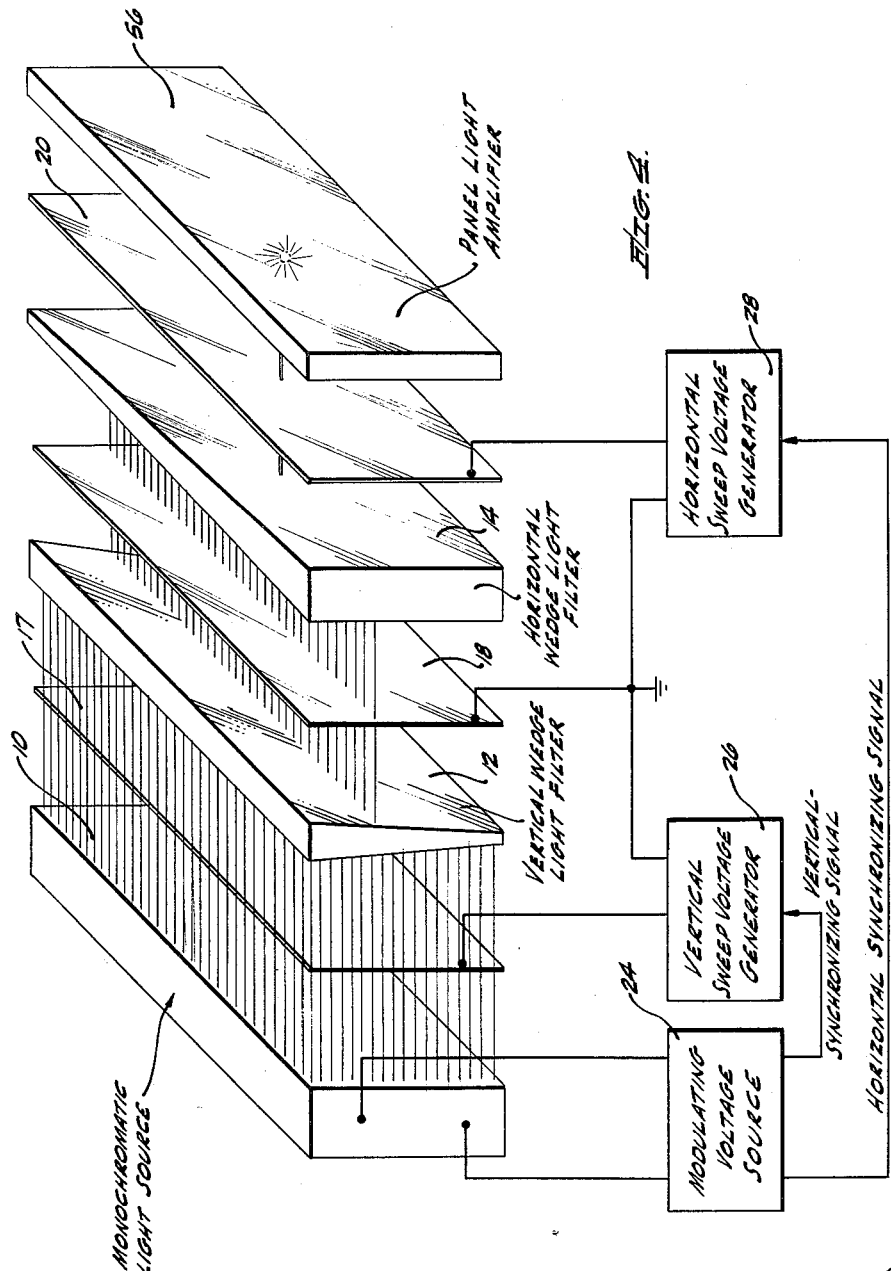
INVENTOR.
JAMES G. ROGERS,
BY
Robert W. Himes
ATTORNEY

United States Patent Office 2,983,786
Patented May 9, 1961

2,983,786

OPTICAL SCANNING DEVICE

James G. Rogers, Fullerton, Calif., assignor to Hughes Aircraft Company, Culver City, Calif., a corporation of Delaware Filed Aug. 29, 1958, Ser. No. 758,043

10 Claims. (Cl. 178—7.3)

This invention relates to a flat optical scanning device and more particularly to apparatus which utilizes multilayer interference techniques and the shift in index of refraction of selected dielectric substances by electrical means to effect the viewing or projecting of a television-type display.

There are many applications where it would be desirable to have an absolutely flat television-type display. In such situations, it is the present practice to employ "shortened" cathode-ray tubes wherein an electron gun is disposed at one corner of a rectangular phosphor screen. Two series of grids or electrodes are employed for beam deflection to produce a discrete, rather than a continuous, scan of the phosphor screen. In any event, deflection circuitry, dynamic beam focusing, and evacuation of the envelope have presented serious development problems in tubes of this type. In addition, the discrete nature of the scan limits resolution as a function of circuit complexity. Finally, all the inherent disadvantages of the conventional cathode-ray tube are present such as fragility, the need for high-vacuum and low- and high-voltage power supplies together with their associated insulation requirements.

It is therefore an object of the present invention to provide a flat display device which has none of the aforementioned difficulties.

Another object of the present invention is to provide optical scanning apparatus employing multilayer interference light filters to produce a television-type display.

Still another object of the present invention is to provide apparatus which utilizes "deflection" potentials that are less than 100 volts to cause a transparent spot to scan an otherwise opaque surface.

A further object of the present invention is to provide an optical scanning device which operates in conjunction with a photoconductive screen to produce a visual presentation having a predetermined persistence.

It is generally known that by depositing the components of a multilayer interference filter with the substrate tilted away from the normal it is possible to make a "spectral wedge" wherein the spectral characteristic increases or decreases as a function of distance along the filter due to the changing optical thickness of the dielectric layers. When a light filter of this type is illuminated with monochromatic light, a thin elongated area or line is transmitted at that position on the filter corresponding to the wave length of the source. That is, when light of a single wavelength is employed, e.g., monochromatic light, the filter will only transmit the light therethrough along a line where the thickness of the individual layers of the filter correspond to one-quarter wavelength of the monochromatic light. Since the individual layers of the light filter are tapered or "wedge-shaped," this transmission will only occur along a line of constant thickness of the respective layers. Light filters of this type can be made of layers of dielectric materials known to exhibit marked changes in index of refraction under electrical excitation.

In the present invention a monochromatic source of light is produced over the desired area of the presentation and modulated in accordance with an intelligence signal. This modulated monochromatic light is then passed through two orthogonal light filters which are composed of layers of dielectric material which are adapted to receive electrical excitation capable of changing the respective indexes of refraction. The two light filters, when considered separately, each allow a line of light to pass therethrough, the positions of which are mutually orthogonal and capable of being varied by the electrical excitation. Thus, in operation a transparent spot is, in essence, scanned over the otherwise opaque surface of the light filters which are adjacent to and coextensive with the area of the modulated monochromatic light source thereby producing a presentation similar to that of a conventional cathode-ray tube. Further, in an alternate embodiment, the modulated spot of light thus generated is used to excite a photoconductive screen to produce a charge pattern which is, in turn, converted into a visual presentation. In this latter embodiment, the "persistence" may be made considerably longer than when the photoconductive screen is not used, thereby broadening the scope of the applications of the device of the present invention.

The above-mentioned and other features and objects of this invention and the manner of obtaining them will become more apparent by reference to the following description taken in conjunction with the accompanying drawings, wherein:

Fig. 1 illustrates an exploded perspective view of a preferred embodiment of the present invention;

Figs. 2 and 3 show characteristics of the multilayer interference light filters incorporated in the device of Fig. 1; and Fig. 4 illustrates an alternate of the embodiment of Fig. 1.

Referring now to Fig. 1 of the drawings, there is shown an exploded view of a preferred embodiment of the device of the present invention. The device comprises a monochromatic light source 10 capable of providing a source of monochromatic light over an area equivalent to that of the visual presentation to be produced. In operation it is necessary that the source 10 of monochromatic light be capable of being modulated in accordance with an intelligence signal. In addition, the device includes vertical and horizontal light filters 12, 14, respectively, which are disposed adjacent to and coextensive with the monochromatic light source 10. It is not essential that the light filters 12, 14 be disposed adjacent to the light source 10 in the order named. The light filters are, however, supported by a substrate provided by a glass pane 16 which has a transparent conductive coating 17 on the side thereof that is disposed in contact with the light filter 12. Transparent conductive coatings 18, 20 are also disposed respectively between the light filters 12, 14 and on the outer surface of the light filter 14. The transparent conductive coatings 18, 20 may be provided, for example, by evaporating a layer of zinc oxide on the respective surfaces of the light filters 12, 14 followed by sputtering with gold or silver. Finally, a translucent pane 22 is disposed adjacent to and coextensive with the outer surface of the outermost light filter 14. The purpose of this translucent pane is to provide a plane for the image produced thereby to avoid color transitions which would be caused by what might be termed "parallax" were it necessary to view the image produced through the multilayer interference filters 12, 14.

In operation an intelligence signal provided by a modulating voltage source 24 is applied to the monochromatic light source 10 in the manner to modulate the intensity of the light produced in accordance with the instantaneous amplitude thereof. A particular manner in which this may be accomplished will be hereinafter explained in more detail. In addition to the intelligence signal, the modulating voltage source 24 provides a vertical synchronizing signal which is applied over a lead 25 to a vertical sweep voltage generator 26 and a horizontal synchronizing signal which is applied over a lead 27 to a horizontal sweep generator 28. The output signal from the vertical sweep voltage generator 26 is used to produce a potential gradient across the light filter 12 by applying it to the transparent conductive coating 17 disposed on the glass pane 16 and the transparent conductive coating 18, the former of which is referenced to ground. Similarly, the output potential from the horizontal sweep voltage generator is used to produce a potential gradient across the light filter 14 by referencing one lead to ground and applying the remaining lead to an adding circuit 30 along with the output sweep voltage from vertical sweep voltage generator 26 to produce a composite sweep voltage signal which constitutes the sum of the vertical and horizontal sweep voltages. This composite sweep voltage is applied over a lead 31 to the transparent conductive coating 20, whereby the sweep voltage produced by the vertical sweep voltage generator 26 is applied across the multilayer light filter 12 and the horizontal sweep voltage produced by the horizontal sweep voltage generator 28 appears across the multilayer light filter 14. That is, the composite sweep voltage signal and the vertical sweep voltage are applied to opposite sides of the multilayer light filter 14 whereby the voltage which actually appears thereacross is the horizontal sweep voltage produced by the horizontal sweep voltage generator 28.

More particularly, the monochromatic light source 10 includes a source of light 34 which is energized by appropriate connections to the terminals of a battery 35. The source 34 may constitute an electroluminescent panel or any other conventional light source which includes the portion of the spectrum which is to be used. In order to make the rays of light from source 34 impinge on the filters at normal incidence, the light therefrom may be collimated by means of a honeycomb panel 36. The collimated light emanating from the honeycomb panel 36 is directed successively through a thin glass pane 38 on the far side of which is disposed a transparent conductive coating 39 provided, for example, by a layer of stannous oxide, a multilayer interference light filter 40 adapted to pass light of a single color uniformly therethrough, a transparent conductive coating 42, an additional multilayer interference light filter 44 adapted to pass light therethrough that is normally of a different wavelength than the light passed through light filter 40, and, lastly, a transparent conductive coating 46. In the fabrication process, the light filters 40, 44 are made by alternately evaporating layers one-quarter light wavelength thick of high index material such as, for example, zinc sulphide, and low index material such as, for example, cryolite. A typical multilayer interference-like filter having eleven layers has a thickness of approximately 1.375 microns. The transparent conductive coatings 42, 46, on the other hand, may be provided as before by evaporating thin layers of zinc oxide followed by sputtering gold or silver thereover on the respective surfaces where necessary.

During operation of the device, the indexes of refraction of the layers of zinc sulphide and cryolite constituting the multilayer filters 40, 44 are determined by the potential gradients applied thereacross. A quiescent potential gradient is applied across the light filter 44 by connecting the transparent conductive coatings 42, 46 to an intermediate terminal and a positive terminal, respectively, of a battery 48, the intermediate terminal of which is referenced to ground. The modulating signal provided by the modulating voltage source 24, on the other hand, is referenced to the negative terminal of battery 48 and applied to the transparent conductive coating 39 which is disposed on the glass pane 38. Because of the large capacitance between the adjacent conductive coatings, it is desirable to apply the video modulating signal to the conductive coating 39 which is farthest away from the vertical and horizontal light filters 12, 14. Under quiescent conditions, as shown in Fig. 2, the light filter 40 passes one portion 50 of the visible spectrum, whereas the light filter 44 passes another portion 52 which is substantially adjacent to but not overlapping the portion passed by light filter 40. Application of the modulating voltage provided by source 24 to the transparent conductive coatings 39, 42 increases the indexes of refraction of the layers of the light filter 40 thereby to progressively shift the portion of the spectrum passed by the light filter 40 as illustrated by dashed lines 50a to cause an increasing overlap of the portions of the spectrum passed by both the light filters 40, 44. That is, only the portions 50a, 52 of the spectrum which overlap transmit light. Further, the output signal of the source 24 may be limited so that the portion 50a passed by light filter 40 will never do more than be shifted to a position that is concurrent with the portion 52 of the spectrum passed by light filter 44.

Thus, summarizing, a collimated white light emanates from the honeycomb panel 36. This collimated white light is converted to monochromatic light by the multilayer interference light filter 40. Multilayer interference light filter 44 then allows only a portion of this monochromatic light to pass through to the vertical and horizontal light filters 12, 14, the magnitude of this portion being determined by the extent of the excitation of the light filter 40. A more detailed description of the above-described shutter arrangement is described in a copending application for patent entitled, "Light Shutter," Serial No. 758,044, filed by James G. Rogers on August 29, 1958 and assigned to the same assignee as is the present case. It is not intended that the scope of the teachings of the present invention be limited to the aforementioned type of shutter arrangement and may, for example, include any means for providing a monochromatic light source adapted to be modulate at a rate consistent with the application for which it is to be used.

The vertical and horizontal light filters 12, 14, unlike the light filters 40, 44, pass only a single horizontal and vertical line of light, respectively. In general, this is accomplished by making the light filters 12, 14 "wedge-shaped"; thus, when a voltage is applied across the filter, the separation, and hence the potential gradient, varies along the length of the filter. This phenomenon is illustrated in Fig. 3 wherein a line 54 represents the locus of progressively increasing wavelengths versus distance along the filter. Thus, if a wedge-shaped filter were to be illuminated with white light, with wavelengths from $\lambda_{01}$ to $\lambda_{02}$, a series of progressively changing color lines would be transmitted therethrough. On the other hand, when monochromatic light of wavelength $\lambda_0$ is employed to illuminate the filter, only a single line having a width "x" determined by the purity of the monochromatic light used for the illumination and the slope of the locus 54. It is evident, therefore, that by increasing the taper of the wedge, the slope of the locus 54 can be increased thereby decreasing the width "x" of the line of light transmitted. A change in the potential gradient across the filters 12, 14 shifts the locus 54 to, for example, the position represented by locus 54a thereby effecting a corresponding shift in the position of the line of light transmitted therethrough.

These "wedge-shaped" filters 12, 14 are fabricated in the same manner as the filters 40, 44 which have a uniform thickness by slightly tilting the substrate on which the alternate layers of zinc sulphide and croylite are evaporated. An eleven layer filter will, in general, increase from 1.0 to 1.38 microns when made in this manner. In the case of the vertical light filter 12, this thickness is made to progressively decrease from top to bottom, as viewed in the drawing. Similarly, the thickness of the light filter 14 is made to progressively decrease from left to right, as viewed in the drawing.

In operation, the amplitude of the sweep voltages provided by the vertical and horizontal sweep voltage generators 26, 28 control indexes of refraction of the vertical and horizontal light filters 12, 14, respectively. In that the light source 10 provides monochromatic light, the light filters 12, 14 will in each case allow only one line of light to pass therethrough. The vertical light filter 12 allows only a horizontal line of monochromatic light to pass therethrough while the horizontal light filter 14 allows only a vertical line of light to pass therethrough. Hence, when considered together, only one spot of light passes through both the vertical and horizontal light filters 12, 14. The amplitude of the vertical sweep voltage developed by the vertical sweep voltage generator 26 determines the ordinate or height of the horizontal line of monochromatic light passing through the light filter 12, whereas the amplitude of the sweep voltage developed by horizontal sweep voltage generator 28 determines the extent along the length of thte horizontal light filter 14 where the vertical line of light which may pass therethrough is positioned. Thus, when considered together, the vertical sweep voltage generator 26 determines the ordinate of the spot of light which passes through both of the filters 12, 14 and the horizontal sweep voltage generator 28 determines its abscissa. In addition, it is generally intended that the intensity of the monochromatic light at a particular ordinate and abscissa of the spot of light which passes through the light filters 12, 14 correspond to the ordinate and abscissa of the visual presentation being produced. In order to accomplish this result, vertical and horizontal synchronizing signals produced by the modulating voltage source 24 are employed to initiate the commencement of the sweep voltages generated by the sweep voltage generators 26, 28, respectively. Thus, in actual operation the spot of light which passes through the vertical and horizontal light filters 12, 14 will trace a path similar to that of an electron beam in a conventional television display tube. The instantaneous intensity of the light passing through the scanned spot corresponds to the amplitude of the intelligence signal thereby to produce a visual presentation of the image represented by the intelligence signal.

Referring to Fig. 4, there is shown a similar embodiment of the device of the present invention wherein like reference numerals refer to like elements defined in connection with the description of the device of Fig. 1. As with the apparatus of Fig. 1, the device of Fig. 4 comprises a monochromatic light source 10 which is adapted to direct collimated rays of monochromatic light sequentially through the transparent conductive coating 17, the vertical light filter 12, the transparent conductive coating 18, the horizontal light filter 14 and the transparent conductive coating 20. As before, the modulated voltage source 24 provides an intelligence signal which is applied to the light source 10 in a manner to modulate its instantaneous intensity. In addition, the voltage source 24 provides a vertical synchronizing signal which is applied to the vertical sweep voltage generator 26 and a horizontal synchronizing signal which is applied to the horizontal sweep voltage generator 28. In the instant case, the transparent conductive coating 18 which separates the vertical light filter 12 from the horizontal light filter 14 is maintained at ground potential by means of a suitable connection thereto. The output signals generated by the vertical and horizontal sweep voltage generators 26, 28 are then referenced to ground and applied, respectively, to the transparent conductive coatings 17, 20. In addition to the above, a panel light amplifier 56 is disposed adjacent to and coextensive with the outermost light filter 14, as shown in the drawing. The purpose of the panel light amplifier 56 is to increase the intensity of the image thus produced and also to provide a means of controlling its persistence. The fabrication of a panel light amplifier of this type is conventional and may, for example, be of the type described in an article entitled, "An Improved High Gain Panel Light Amplifier," by B. Kazan, published on p. 1358 of the October 1957 issue of the Proceedings of the IRE. The remaining portion of the device operates in the same manner as the device described in connection with Fig. 1.

What is claimed is:

1. An optical scanning apparatus comprising means for providing a beam of substantially monochromatic light; means interposed in said beam and including a multilayer interference light filter having at least one predetermined index of refraction and a thickness that is tapered along a selected direction for transmitting an elongated portion of said beam, said elongated portion being substantially normal to said selected direction; and means for electrically changing said predetermined index of refraction thereby to shift the position of said elongated portion of said beam along said selected direction.

2. An optical scanning apparatus comprising a first multilayer interference light filter having a first index of refraction and a thickness that is tapered along a first direction, a second multilayer interference light filter having a second index of refraction and a thickness that is tapered along a second direction different from said first direction, said second light filter being disposed adjacent to one side of said first light filter, means for illuminating at least a portion of the remaining side of said first light filter with light having wavelengths within a predetermined narrow portion of the spectrum whereby said light is transmitted through first and second elongated areas disposed substantially transverse to said first and second directions, respectively, and means for electrically changing said first and second indexes of refraction thereby to change the positions of said first and second elongated areas along said first and second directions, respectively.

3. The optical scanning apparatus as defined in claim 2 whereby said first and second directions are mutually perpendicular whereby only a spot of light common to both of said first and second elongated areas is transmitted through said first and second light filters.

4. An optical scanning apparatus comprising means for providing a source of monochromatic light having a uniform intensity over a predetermined area; means for varying the instantaneous intensity of said monochromatic light in accordance with the amplitude of an intelligence signal; means including a first multilayer interference light filter composed of a first plurality of layers of dielectric material disposed adjacent to and coextensive with said predetermined area, said first light filter including layers of dielectric material having a first index of refraction and layer having a thickness that are tapered along a first direction; a second multilayer interference light filter composed of a second plurality of layers of dielectric material disposed adjacent to said first light filter on the side thereof farthest from said source of monochromatic light, said second light filter including layers of dielectric material having a second index of refraction and layers having a thickness that are tapered along a second direction orthogonal to said first direction, for transmitting light through first and second elongated portions of said first and second light filters, respectively, and disposed substantially transverse to said first and second directions, respectively; and means for electrically progressive changing said first and second indexes of refraction in synchronism with said intelligence signal to sweep first and second elongated areas along said first and second direction, respectively, thereby to produce a visual representation of said intelligence signal.

5. The optical scanning apparatus as defined in claim 4 which additionally includes a panel light amplifier disposed adjacent to and coextensive with said second light filter thereby to increase the light intensity of said visual representation.

6. The optical scanning apparatus as defined in claim 4 which additionally includes a translucent pane disposed adjacent to and coextensive with said second light filter thereby to provide a surface for said visual representation.

7. An optical scanning apparatus comprising means for providing a source of monochromatic light having a uniform intensity over a predetermined area; a modulating voltage generator for providing an intelligence signal and first and second sweep synchronizing signals; means responsive to said intelligence signal for varying the instantaneous intensity of said monochromatic light in accordance therewith; first and second multilayer interference light filters disposed adjacent to and coextensive with said predetermined area, said light filters having first and second indexes of refraction and thicknesses that taper along first and second mutually perpendicular directions, whereby said light is transmitted through first and second elongated areas disposed subtantially transverse to said first and second directions, respectively; a first transparent conductive coating disposed intermediate said light source and said first light filter; a second transparent conductive coating disposed intermediate said first and second light filters; a third transparent conductive coating disposed on the side of said second light filter farthest from said source of monochromatic light; and means responsive to said first and second sweep synchronizing signals and coupled to said first, second and third transparent conductive coatings for electrically progressively changing said first and second indexes of refraction in synchronism with said intelligence signal to sweep first and second elongated areas along said first and second directions, respectively, thereby to produce a visual representation of said intelligence signal.

8. An optical scanning apparatus as defined in claim 7 wherein said means responsive to said first and second sweep synchronizing signals and coupled to said first, second and third transparent conductive coatings includes means for maintaining said first conductive coating at substantially fixed potential; a first sweep voltage generator responsive to said first sweep synchronizing signal for producing a first sweep voltage signal on said second transparent conductive coating relative to said first transparent conductive coating; a second sweep voltage generator responsive to said second sweep synchronizing signal for producing a second sweep voltage signal; and means including an adding circuit responsive to said first and second sweep voltage signals for applying a composite sweep voltage signal constituting the sum of said first and second sweep voltage signals to said third transparent conductive coating whereby said second sweep voltage signal is developed across said second light filter.

9. An optical scanning apparatus as defined in claim 7 wherein said means responsive to said first and second sweep synchronizing signals and coupled to said first, second and third transparent conductive coatings includes means for maintaining said second transparent conductive coating at a substantially fixed potential; a first sweep voltage generator responsive to said first sweep synchronizing signal for applying a first sweep voltage signal to said first transparent conductive coating; and a second sweep voltage generator responsive to said second sweep synchronizing signal for applying a second sweep voltage signal to said third transparent conductive coating.

10. An optical scanning apparatus comprising means for providing a source of light having a uniform intensity over a predetermined area, a first multilayer interference light filter disposed adjacent to and coextensive with said predetermined area, said first light filter being of uniform thickness and having a first index of refraction, thereby to transmit a first portion of the light spectrum; a second multilayer interference light filter disposed adjacent to and coextensive with said first light filter, said second light filter being of uniform thickness and having a second index of refraction adapted to pass a second discrete portion of the light spectrum, means for electrically changing said first index of refraction with respect to said second index of refraction to effect overlapping of said first and second portions of light spectrum in proportion to the instantaneous amplitude of an intelligence signal; a third multilayer interference light filter having a third index of refraction and a thickness that is tapered along a first direction; a fourth multilayer interference light filter having a fourth index of refraction and a thickness that is tapered along a second direction, said third and fourth light filters being disposed adjacent to the exposed side of said first and second light filters whereby light is transmitted through first and second elongated areas of said third and fourth light filters, respectively, said first and second elongated areas being disposed substantially transverse to said first and second directions, respectively, and means for electrically changing said third and fourth indexes of refraction thereby to change the positions of said first and second elongated areas along said first and second directions, respectively.

References Cited in the file of this patent

UNITED STATES PATENTS

| | | |
|---|---|---|
| 1,770,535 | Sukumlyn | July 15, 1930 |
| 1,958,606 | Brich-Field | May 15, 1934 |
| 1,997,371 | Loiseau | Apr. 9, 1935 |
| 2,600,962 | Billings | June 17, 1952 |
| 2,670,402 | Marks | Feb. 23, 1954 |
| 2,723,556 | Willard | Nov. 15, 1955 |
| 2,780,958 | Wiley | Feb. 12, 1957 |
| 2,836,652 | Sprague | May 27, 1958 |